(12) United States Patent
White et al.

(10) Patent No.: US 7,421,787 B2
(45) Date of Patent: Sep. 9, 2008

(54) THUMB UTENSIL WITH CUTTING BOARD

(75) Inventors: Jackson Wells White, Rock Hill, SC (US); Daniel Lee Bizzell, Charlotte, NC (US); Tom J. Philpott, Charlotte, NC (US)

(73) Assignee: Wonder Thumb Products, LLC, Rock Hill, SC (US)

( * ) Notice: Subject to any disclaimer, the term of this patent is extended or adjusted under 35 U.S.C. 154(b) by 230 days.

(21) Appl. No.: 11/205,847

(22) Filed: Aug. 17, 2005

(65) Prior Publication Data

US 2007/0039193 A1 Feb. 22, 2007

(51) Int. Cl.
*B26B 27/00* (2006.01)

(52) U.S. Cl. .......................... 30/123; 30/279.6; 30/290; 30/291; 30/298; 2/16; 2/21; 7/158

(58) Field of Classification Search .................. 30/290, 30/291, 298; D3/28, 29; 223/101; 269/3, 269/289 R; 2/21, 159, 160, 161.1, 161.2, 2/161.6, 163; 602/21, 22; 128/879, 880; D29/113, 114; D7/693
See application file for complete search history.

(56) References Cited

U.S. PATENT DOCUMENTS

| | | | |
|---|---|---|---|
| 622,386 A * | 4/1899 | Peery ........................... 30/298 |
| 885,569 A | 4/1908 | Berquist |
| 1,184,710 A * | 5/1916 | Baumann ......................... 2/21 |
| 1,367,876 A | 2/1921 | Heffner |
| 1,444,976 A * | 2/1923 | Mandley ....................... 30/298 |
| 1,563,954 A * | 12/1925 | Barton ......................... 223/101 |
| 2,070,506 A * | 2/1937 | Bevill ............................. 2/21 |
| 2,077,540 A * | 4/1937 | Welker ........................ D4/103 |
| 2,149,922 A * | 3/1939 | Lemire ............................. 2/21 |
| D117,904 S * | 12/1939 | Kormendy .................... D7/669 |
| 2,259,388 A * | 10/1941 | Mell ............................... 2/21 |
| D136,947 S * | 1/1944 | Brittingham ..................... D8/3 |
| D162,924 S * | 4/1951 | Becherer ...................... D7/693 |
| 3,046,561 A * | 7/1962 | Marinese et al. .................. 2/21 |
| 3,164,841 A * | 1/1965 | Burtoff ............................. 2/21 |
| 3,217,334 A * | 11/1965 | Albertelli ......................... 2/21 |
| 3,295,203 A * | 1/1967 | Thompson .................... 30/232 |
| D218,723 S | 9/1970 | Westbrook |
| 3,728,736 A * | 4/1973 | Pugh ............................. 2/21 |

(Continued)

FOREIGN PATENT DOCUMENTS

GB 2320423 A * 6/1998

(Continued)

*Primary Examiner*—Jason Prone
(74) *Attorney, Agent, or Firm*—Tillman Wright, PLLC; Chad D. Tillman; James D. Wright

(57) ABSTRACT

A utensil for a digit of a hand includes a cutting board for disposition between a thumb and an index finger. The cutting board is attached to a retainer that receives and retains the thumb such that a cutting surface of the cutting board is oriented toward the index finger. The cutting surface protects the thumb during cutting of items against the cutting surface. Optionally, one or more tools are defined by, or attached to, the cutting board. In a particular example, a utensil for a digit of a hand having a cutting board is useful at least for cleaning, zesting, peeling, and paring or chopping a fruit or vegetable.

29 Claims, 17 Drawing Sheets

U.S. PATENT DOCUMENTS

| | | | |
|---|---|---|---|
| 3,734,003 A | | 5/1973 | Gerson |
| 4,025,077 A | * | 5/1977 | Thompson ................... 2/161.1 |
| D263,917 S | | 4/1982 | McCulley |
| 4,339,878 A | | 7/1982 | Tozzi |
| 4,507,804 A | * | 4/1985 | Consigny ......................... 2/21 |
| D283,579 S | | 4/1986 | Peterson |
| 4,630,367 A | * | 12/1986 | Pressman et al. ............. 30/290 |
| 5,038,479 A | | 8/1991 | Davis |
| 5,234,142 A | | 8/1993 | Loewen et al. |
| D339,235 S | * | 9/1993 | Hirzel ......................... D4/116 |
| D340,585 S | | 10/1993 | Kirk |
| D351,257 S | * | 10/1994 | Roberts et al. ............. D29/113 |
| D362,118 S | * | 9/1995 | Nelson ....................... D4/103 |
| D373,225 S | * | 8/1996 | Theroux et al. ............ D29/114 |
| 5,659,962 A | * | 8/1997 | Tagou ........................ 30/298 |
| 5,711,027 A | * | 1/1998 | Katz et al. ...................... 2/21 |
| 5,715,736 A | * | 2/1998 | Cherney ......................... 269/3 |
| D394,150 S | * | 5/1998 | George et al. ................. D3/29 |
| 5,807,018 A | * | 9/1998 | Peek et al. ................... 403/397 |
| 5,899,444 A | * | 5/1999 | Rempe ............................ 269/3 |
| 5,954,245 A | * | 9/1999 | Kluesner .................... 223/101 |
| D418,258 S | * | 12/1999 | Moro ........................ D29/114 |
| 6,012,165 A | * | 1/2000 | Cain ................................ 2/21 |
| 6,237,148 B1 | * | 5/2001 | Graham ........................... 2/21 |
| 6,409,059 B1 | * | 6/2002 | Calvert ....................... 223/101 |
| D465,306 S | * | 11/2002 | Price ........................... 29/114 |
| 6,726,068 B2 | * | 4/2004 | Miller ........................ 223/101 |
| 6,729,510 B1 | * | 5/2004 | Romanov ................... 223/101 |
| 6,808,068 B2 | | 10/2004 | Abada |
| 6,837,796 B2 | * | 1/2005 | Bernhardt ........................ 2/21 |
| D553,804 S | * | 10/2007 | Kaposi ....................... D29/114 |
| D558,540 S | * | 1/2008 | White et al. ................. D7/693 |
| 2004/0098868 A1 | * | 5/2004 | Pieper .......................... 30/398 |
| 2005/0150029 A1 | * | 7/2005 | Votolato ......................... 2/16 |

FOREIGN PATENT DOCUMENTS

JP             10114790 A   *   1/1998

* cited by examiner

THUMB UTENSIL WITH CUTTING BOARD

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The invention relates to various fields wherein professionals, hobbyists, craftsmen, dilettantes, artists, and workers are engaged in activities involving hand-held tools and implements that are so numerous as to clutter an area and become an imposition with regard to organizing, maintaining, and cleaning the tools and implements. For example, busy chefs, outdoor grilling aficionados, and midnight snackers prepare, chop, spice, and garnish foods for flavor and appeal using such implements as cleaning brushes, cutting boards, peelers, and zesters. Even the preparation of a simple salad of greens and carrot pennies can partially fill a sink with implements and tools requiring cleaning. Many are all too familiar with the awkward juggling of items that typically occurs on camping trips and tailgate parties where foods are prepared in the absence of clean and stable kitchen-counter surfaces. Shortcuts to avoid carrying and cleaning a host of articles are often preferred despite risks such shortcuts represent. In one often seen example, a hurried homemaker cuts a vegetable utilizing only a knife and unprotected hands. In another, a do-it-yourself electrician trims insulation from the end of an electrical wire by rolling the wire between a thumb and a sharp blade. It seems that in many fields of endeavor, people seeking conveniences are subjecting themselves to unnecessary risks.

SUMMARY OF THE INVENTION

A first aspect of the invention generally relates to a cutting board for disposition on a hand. This aspect relates more particularly to a cutting board for disposition on a thumb, and a retainer for receiving the thumb along a longitudinal axis thereof. The cutting board, which extends transversely to the longitudinal axis beyond opposite sides of the retainer, has an uninterrupted cutting surface for orienting toward the index finger and for protection of the thumb during cutting of an item against the cutting surface.

Optionally, the cutting board and retainer are formed of different materials. For example, the cutting board is optionally formed of a harder material that that of which the retainer is formed.

Furthermore, the cutting board optionally includes graphical indicia relating to any subject for providing information, amusement, or advertising.

The cutting board optionally defines one or more tools. Exemplary tools include a zester, a peeler, a slicer, a grater, a pastry comb, a measuring spoon, and a bottle opener. Such tools are optionally defined by apertures and recesses defined in the cutting board by the exclusion of material at the time of formation of the cutting board such as, for example, in an injection molding process.

A second aspect of the invention relates generally to a shield for disposition on an appendage. This aspect relates more particularly to a convex shield and a sheath attached to the shield for receiving the digit of a hand such that the shield curves around and at least partially encircles the digit for protection thereof. In this regard, the shield, which extends transversely to the sheath beyond opposite sides of the sheath, is uninterrupted for protection of the digit during cutting against the shield.

A third aspect of the invention relates generally to a method of manufacturing an article having a cutting board for disposition on a hand. More particularly, this aspect relates to a method of manufacturing an article by first manufacturing a cutting board and then co-molding a retainer onto the cutting board. Optionally, an aperture is formed through the cutting board by exclusion of flowing material during an injection molding step.

BRIEF DESCRIPTION OF THE DRAWINGS

One or more embodiments of the present invention will be described in detail with reference to the accompanying drawings which are briefly described below, wherein the same elements are referred to with the same reference numerals, and wherein various elements are not necessarily shown in conformance to any particular absolute or relative scale.

DETAILED DESCRIPTION

Figure 1:
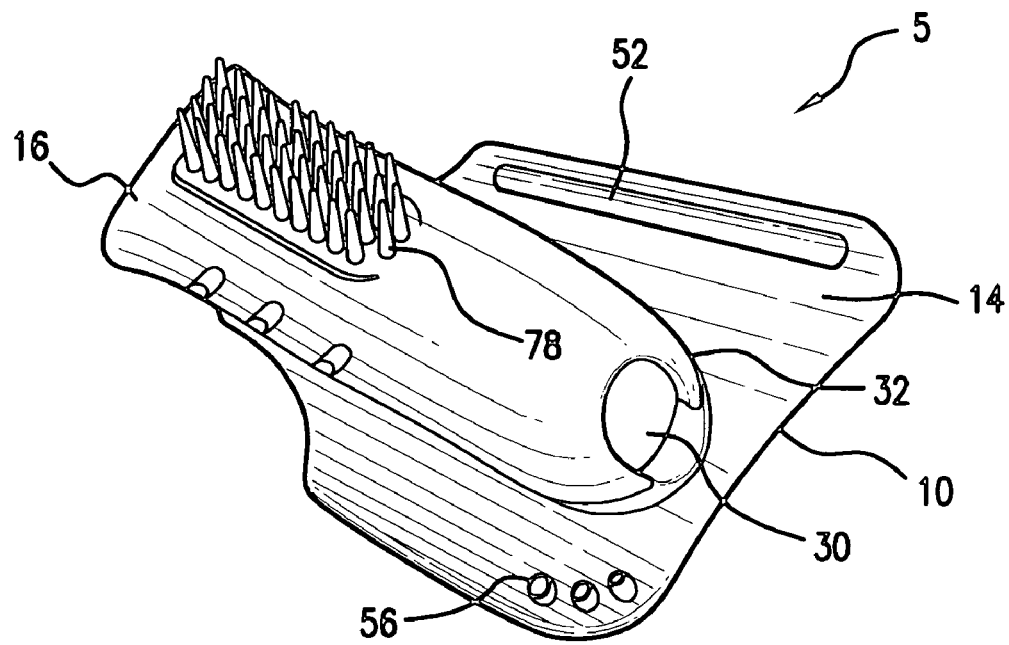
FIG. 1 is a perspective view of a first embodiment of the invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Figure 4:
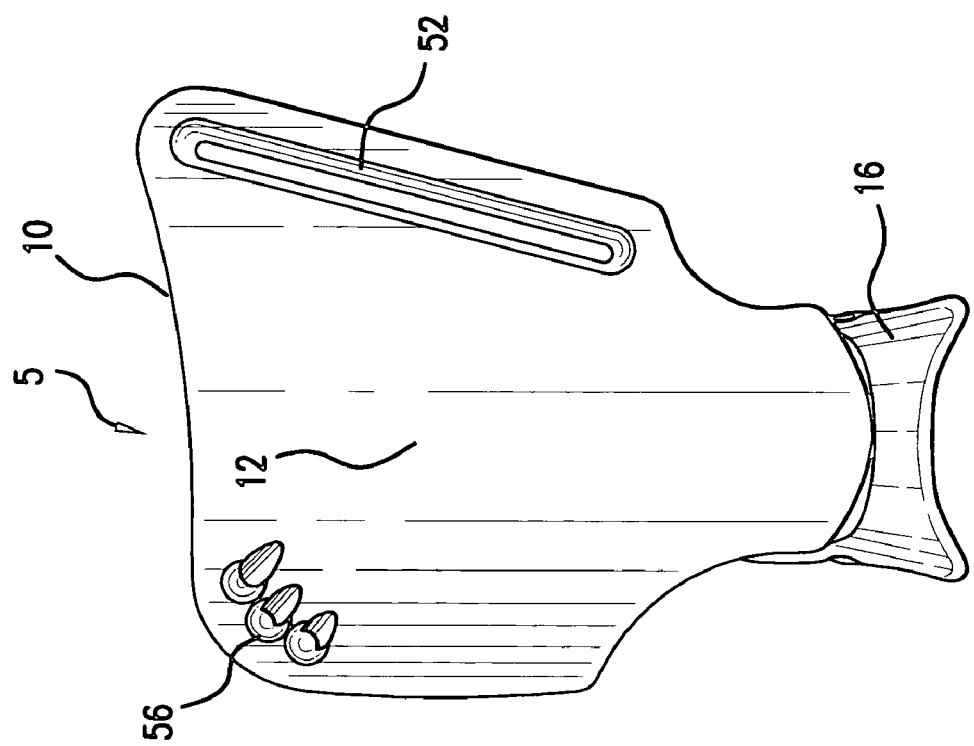
FIG. 4 is a bottom plan view of the embodiment of FIG. 1.

A first embodiment of the invention relates to an article for hand-processing whole fruits and vegetables or parts thereof. As shown in various views in FIGS. 1-9, and as shown in use in FIGS. 10-11, the article 5 according to the first embodiment comprises a cutting board 10 for disposition between a thumb and an index finger. The cutting board 10 has a cutting surface 12 for orienting toward an index finger and a second surface 14 for orienting toward a thumb. A retainer 16 is attached to the cutting board 10 for receiving and releasably retaining a thumb along a longitudinal axis 18 (FIG. 3) of the retainer. The cutting board 10 extends transversely to the longitudinal axis 18 (FIG. 3) beyond opposite sides 20,22 of the retainer 16. The cutting surface 12 (FIG. 4) extends between the opposite sides 20,22 of the retainer 16 and is uninterrupted for protection of the thumb during cutting (FIG. 10) against the cutting surface.

Figure 9:
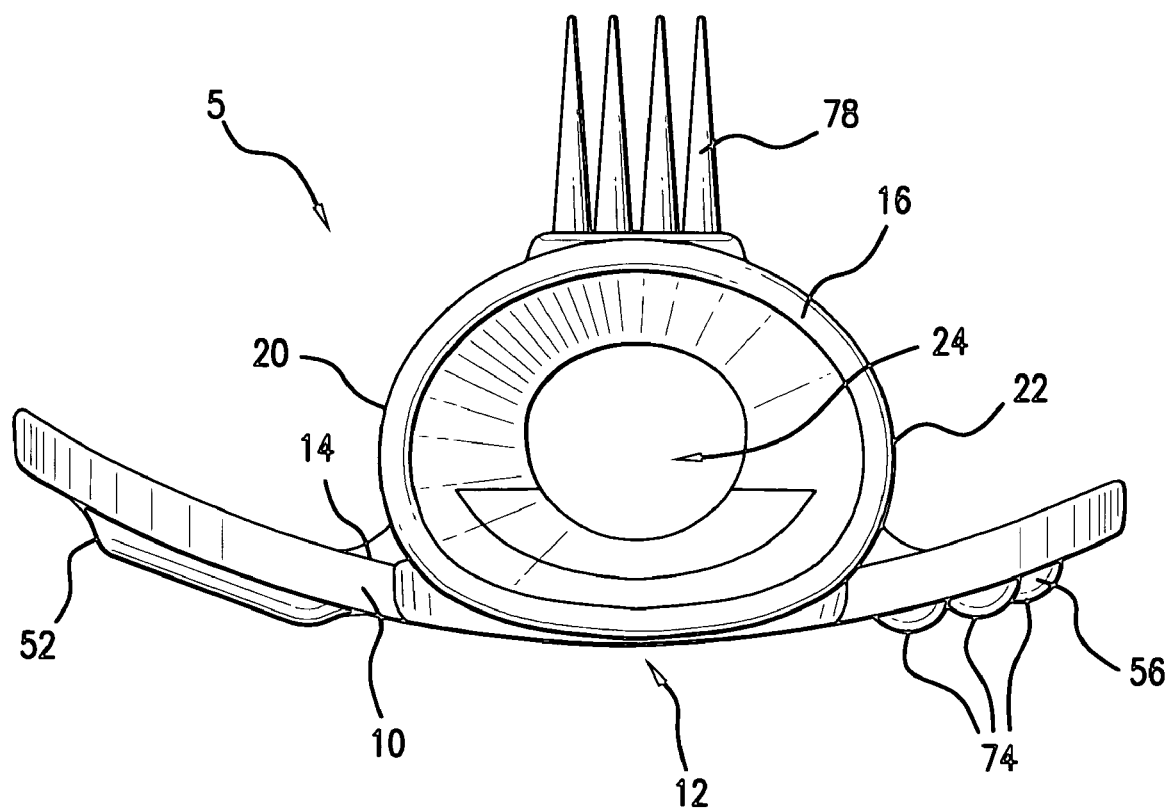
FIG. 9 is another elevational view along the longitudinal axis of the embodiment of FIG. 1.

A lumen 24, the interior of which is shown in FIG. 9, for receiving and releasably retaining a thumb is defined between the retainer 16 and the second surface 14 of the cutting board 10. In the first embodiment, the retainer 16 defines a first opening 26 (FIG. 2) adjacent a first end 28 of the retainer. The first opening 26 is dimensioned to allow passage there through of a thumb whereby the retainer fully encircles a thumb at the first end 28 of the retainer when the thumb is received. A second opening 30 (FIG. 1) is defined between the retainer 16 and second surface 14 adjacent a second end 32 of the retainer for, among other things, allowing comforting ventilation when the thumb is received. The lumen 24 of the first embodiment is thereby substantially open at both ends 28,32 of the retainer for, among other things, allowing thorough washing and rapid drying of the interior of the lumen thereby minimizing the build up of residual matter and bacterial growth.

Regarding the form of the cutting board 10, the cutting surface 12 thereof comprises a convex curved surface (FIG. 7), and the second surface 14 thereof comprises a corresponding concave curved surface. Furthermore, the cutting board 10 is shaped such that a first notch 34 (FIG. 3) is defined and a second notch 36 (FIG. 3) is defined. Moreover, contours, indentations, grooves, or channels 38 (FIGS. 5,6) are formed in the sides 22,20 of the retainer 16.

Figure 10:
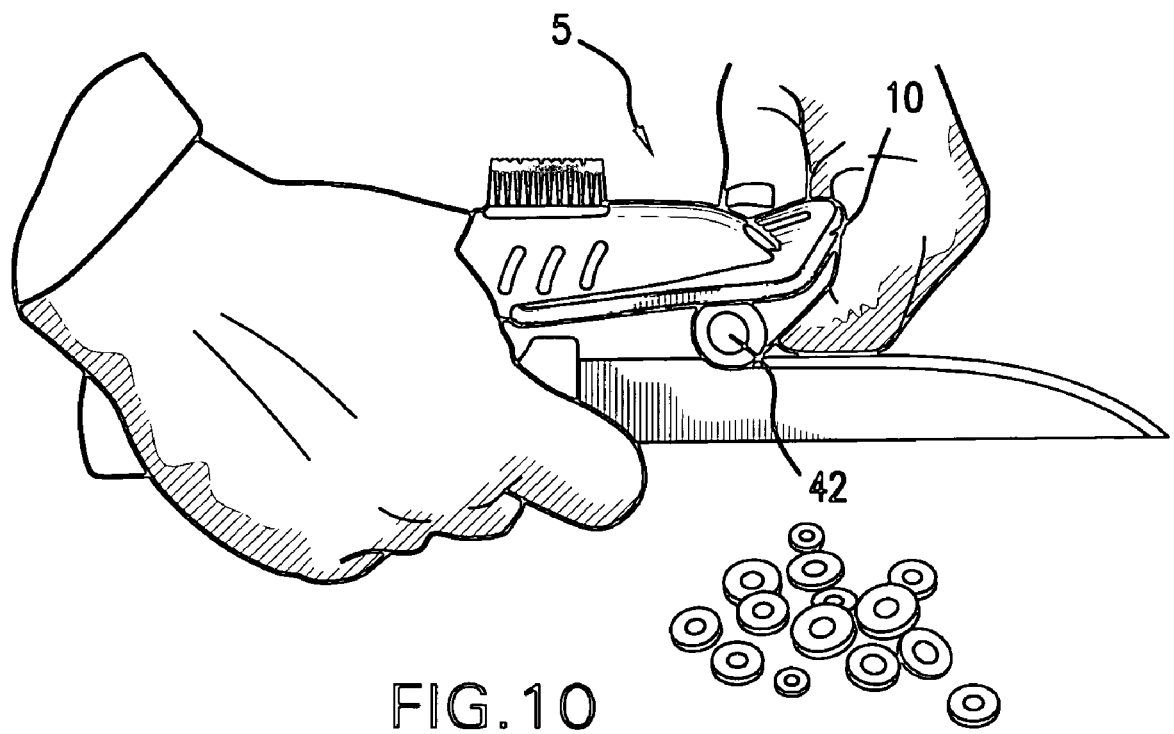
FIG. 10 is an environmental perspective view of the embodiment of FIG. 1 disposed for protection of a thumb during the cutting of a vegetable.

A first inventive method of cutting or paring an item 42, such as a carrot, is shown in FIG. 10. In this first method, the retainer 16 receives the thumb of the right hand such that the cutting board 10 is disposed between the right thumb and index finger with the cutting surface 12 (FIG. 4) of the cutting board 10 oriented toward the index finger. The right hand also grasps a knife with the cutting edge thereof oriented toward the cutting surface. The item 42 to be cut or pared is grasped by the left hand and is disposed between the cutting board 10 and the knife. The item 42 is cut by a closing movement (not shown) of the right hand that brings the knife into abutment with the cutting surface of the cutting board thereby cutting through the item. The right thumb is protected by the uninterrupted cutting surface during the cutting of the item 42 against the cutting surface.

A second inventive method (not shown) of cutting or paring an item is substantially similar to the first method (FIG. 10) in that the roles of the left and right hands are merely interchanged. That is, in the second method, the cutting board and knife are manipulated by the left hand while the item to be cut is grasped by the right hand and is disposed between the cutting board and the knife. The item is cut by a closing movement of the left hand that brings the knife into abutment with the cutting surface of the cutting board. The left thumb is protected by the uninterrupted cutting surface 12 (FIG. 4) during the cutting of the item against the cutting surface.

Figure 3:
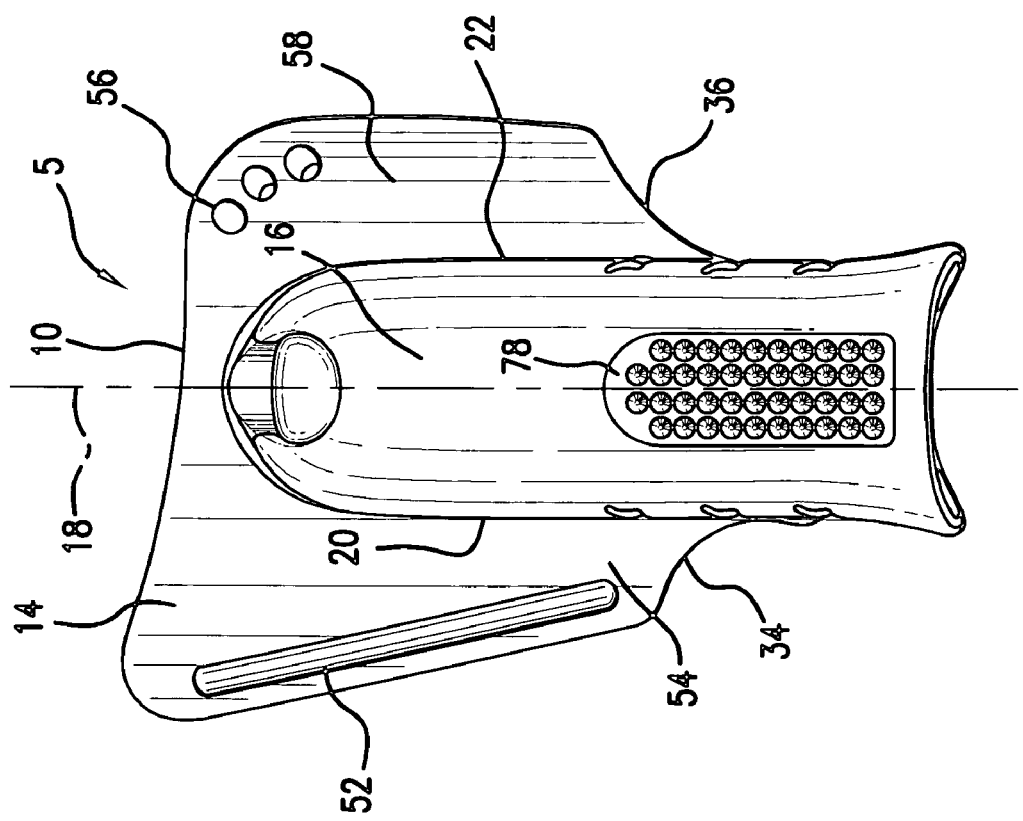
FIG. 3 is a top plan view of the embodiment of FIG. 1.
Figure 5:
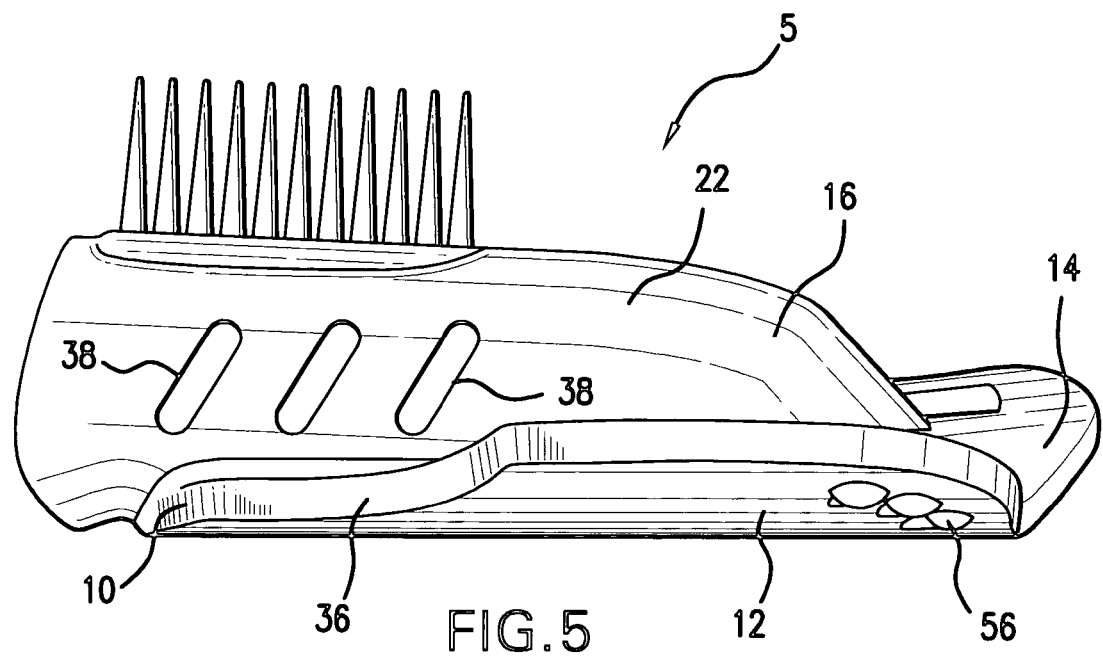
FIG. 5 is a side elevational view of the embodiment of FIG. 1.
Figure 6:
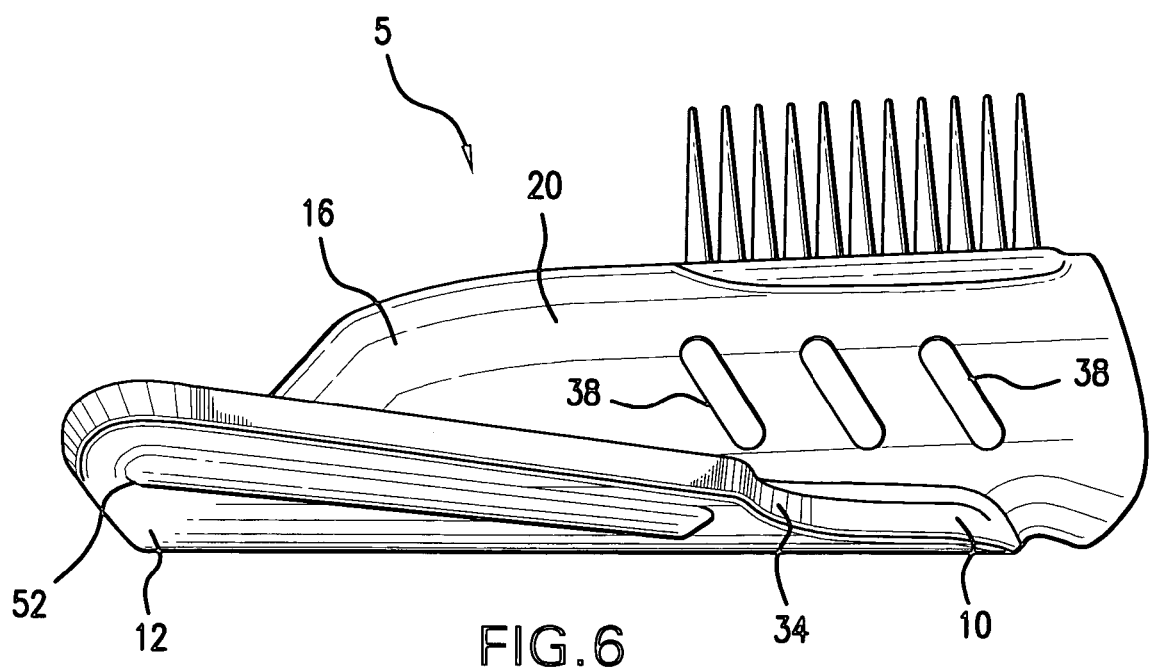
FIG. 6 is another side elevational view of the embodiment of FIG. 1.
Figure 7:
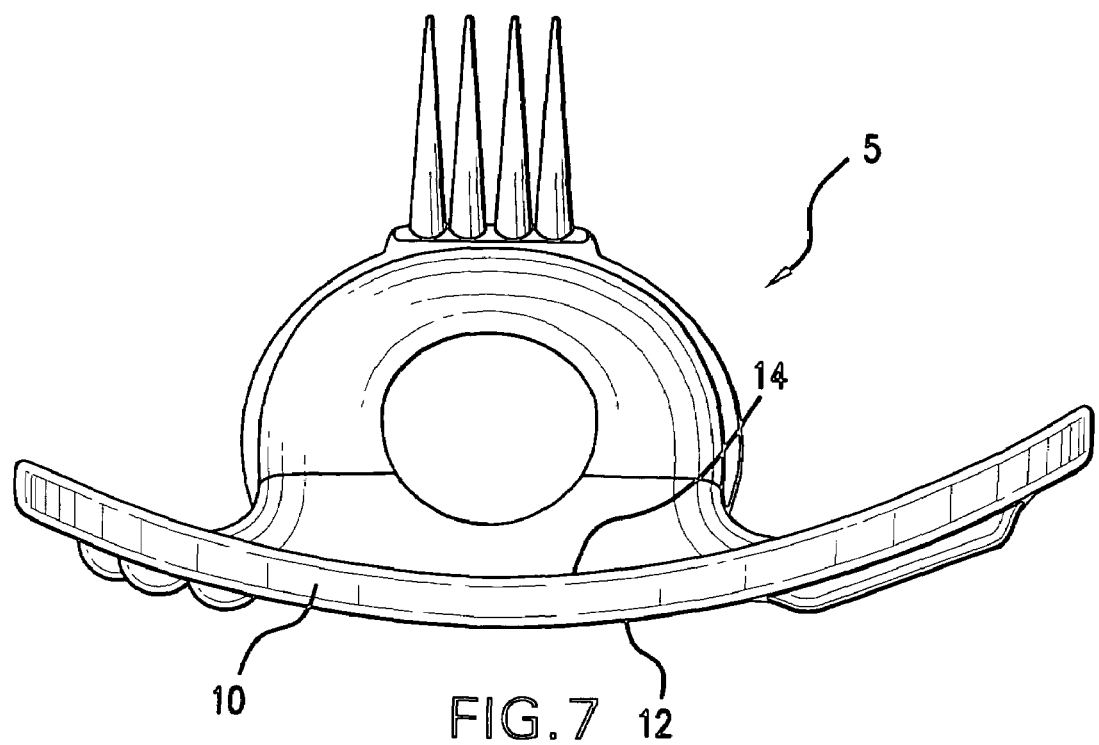
FIG. 7 is an elevational view along a longitudinal axis of the embodiment of FIG. 1.
Figure 8:
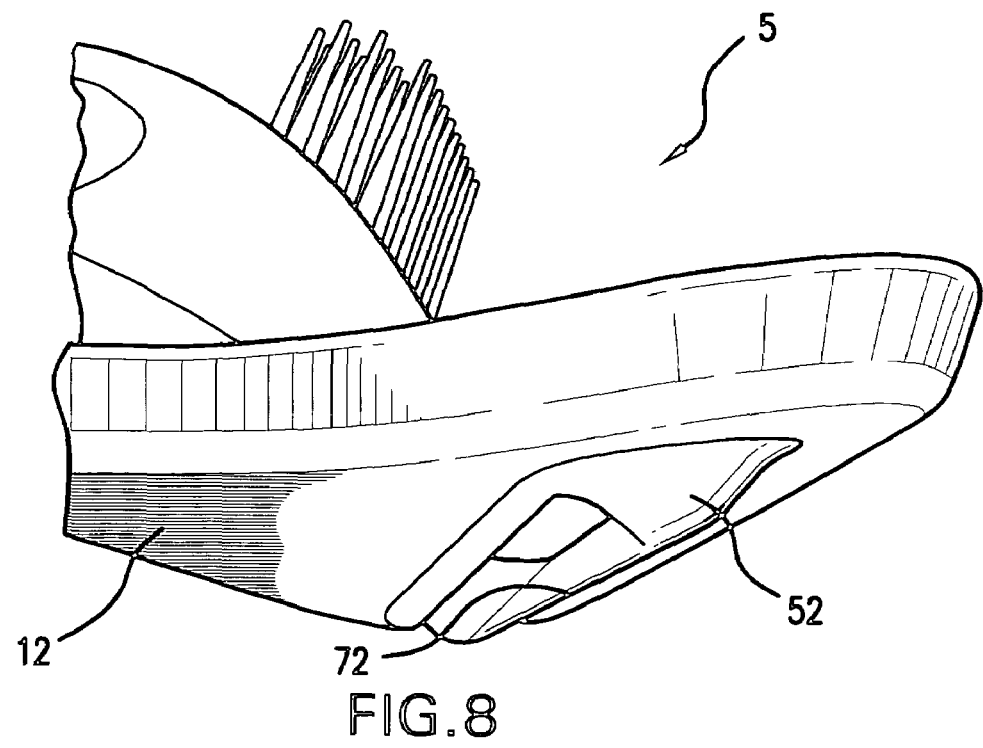
FIG. 8 is a partial perspective view of an area of the embodiment of FIG. 1.

According to one or more embodiments of the invention, an article comprising a cutting board further comprises a tool defined by, attached to, or extending from the cutting board. For example, as shown in FIG. 3, the inventive article 5 according to the first embodiment of the invention comprises a first tool 52 defined by the first portion 54 of the cutting board 10 that extends transversely to the longitudinal axis 18 beyond the first side 20 of the retainer 16, and a second tool 56 defined by the second portion 58 of the cutting board that extends beyond the second side 22 of the retainer.

Figure 11:
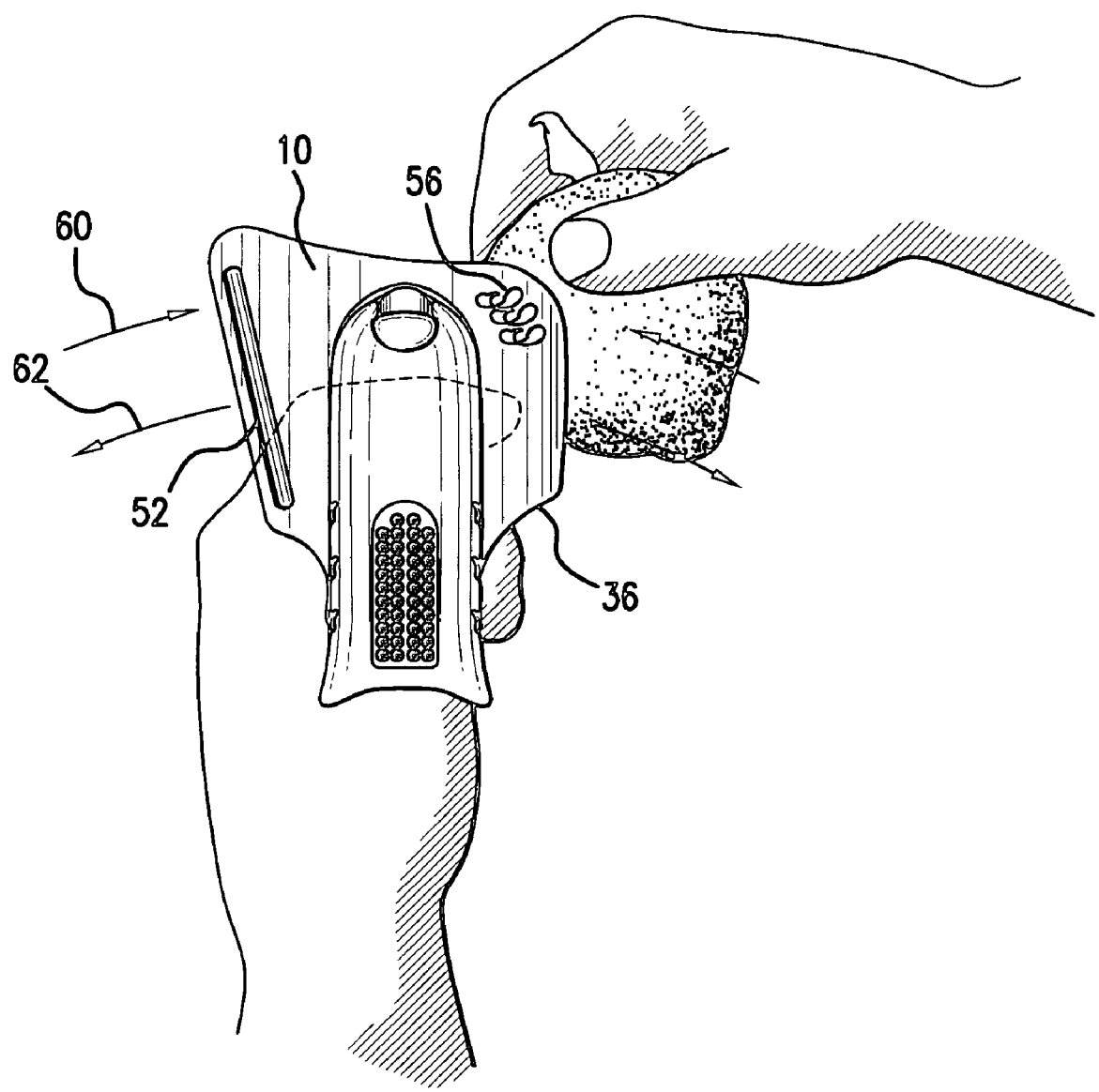
FIG. 11 is an environment plan view of the embodiment of FIG. 1 being used to zest a fruit.

In the first embodiment of the invention, the first and second tools relate to processing fruits and vegetables while in other embodiments tools relate to other purposes. With particular regard to the first embodiment, the first tool 52 comprises a peeler for peeling fruits and vegetables, and the second tool 56 comprises a zester for zesting the skins of fruits and vegetables. When the article 5 is disposed on a thumb, for example as shown in FIG. 11, the first tool 52 is generally useful for peeling a fruit or vegetable through a sweeping movement of the thumb in a first direction 60, and the second tool 56 is generally useful for zesting the skin of a fruit or vegetable through an opposite sweeping movement of the thumb in a second direction 62 opposite the first direction. For example, in FIG. 11, the skin of a lemon is zested by movement of the article 5 in the second direction 62 with the cutting board 10 pressed against the lemon such that the second tool 56, namely the zester, removes strips of peel from the lemon.

Figure 2:
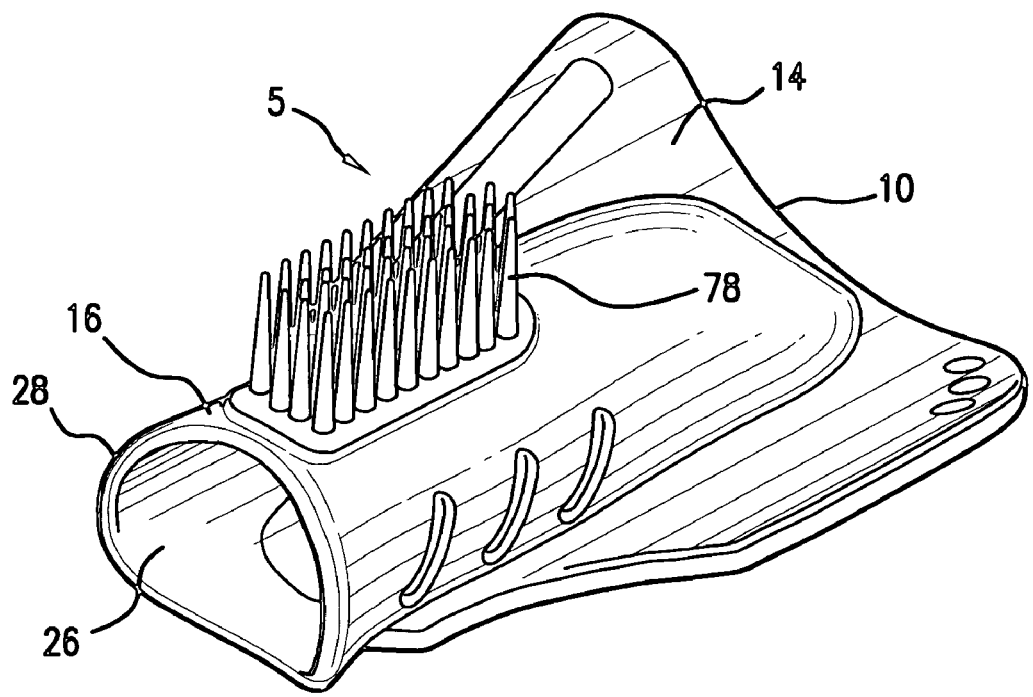
FIG. 2 is another perspective view of the embodiment of FIG. 1.

Furthermore, according to one or more embodiments of the invention, an article comprising a retainer further comprises one or more tools defined by, attached to, or extending from the retainer. For example, as shown in FIGS. 2-3, the inventive article 5 according to the first embodiment of the invention comprises a third tool 78, namely a brush, for cleaning a fruit or vegetable. Preferably, the retainer and third tool are integrally formed from the same material. Thus, the first embodiment of the invention, article 5 (FIG. 1), is useful at least for cleaning, zesting, peeling, and paring or chopping a fruit or vegetable.

In the first embodiment of the invention, the cutting board 10 (FIGS. 3-4) of the article 5 defines the first tool 54 and second tool 56 in that each tool is defined by one or more respective apertures or recesses defined in the cutting board. The one or more respective apertures are preferably formed by exclusion of flowing material at the time of formation of the cutting board in a molding process such as, for example, in an injection molding process. The cutting board 10 and tools defined by the cutting board 10 are integrally and unitarily formed from the same material.

The material of which the cutting board 10 is formed is capable of protecting a thumb and is capable of forming sharp edges. That is, the material is preferably rigid and durable for protecting a thumb during cutting of items against the cutting surface 12. Furthermore, the material is furthermore capable of forming sharp edges such as the cutting edge 72 (FIG. 8) of the first tool 52, namely the peeler, and such as the cutting edges 74 (FIG. 9) of the second tool 56, namely the zester. Therefore, in the first embodiment, the cutting board 10 is preferably formed of a hard plastic material such as Nylon 66. Other examples of durable materials include, but are not limited to, polycarbonate, polyoxymethylene, polymethylmethacrylate (PMMA), polyacetal, urea-formaldehyde, polystyrene, and vinyl polymers. In any event, in at least the first embodiment of the invention, the cutting board 10 and tools defined thereby are integrally and unitarily formed of a single material of which several exemplary materials have been listed herein.

It is certainly within the scope of these descriptions that a retainer, attached to a cutting board, be formed of the same material as that of which the cutting board is formed. Furthermore, it is within the scope of these descriptions that a cutting board, tools defined by the cutting board, and a retainer attached to the cutting board all be together integrally formed in a single step or multiple step molding process such as, for example, an injection molding process, or be machined to produce a unitarily formed article. Nevertheless, certain known and other benefits arise in preferred embodiments of the invention in which retainers are formed of materials that are softer, more stretchable, more resilient, and more pliable than the materials of which the cutting boards are formed. Indeed, the cutting board preferably is hard and rigid, and not stretchable, resilient, or pliable.

For example, somewhat soft, rubbery materials generally provide more tactile grip than harder materials. Thus, a soft, rubbery retainer likely generally retains a thumb better than a hard slick retainer formed of nylon or the like. Furthermore, with regard to the first embodiment of the invention wherein the third tool 78 (FIGS. 2-3), namely the brush, extends from retainer 16 and is preferably integrally formed therewith, a relatively soft material may better preserve delicate fruit skins during cleaning than would rigid bristles formed of hard nylon that might tear the skin of a fruit such as a plum.

In particular, in the first embodiment of the invention (FIG. 9), wherein the cutting board is preferably formed of a hard and durable material such as Nylon 66, the retainer 16 is formed of a stretchable and recoverable material for, among other things, accommodating thumbs having different sizes and shapes within the lumen 24 (FIG. 9). The retainer is therefore preferably formed of an elastomeric material, for example a thermoplastic elastomer that is flowable and moldable. Other exemplary materials for the retainer include, but are not limited to, silicone, high temperature silicone, and rubber.

With regard to manufacturing the article 5 (FIG. 1), an exemplary method comprises the step of molding the cutting board 10, and the step of molding the retainer onto the cutting board. The step of molding the cutting board includes forming the first tool 52 and second tool 56 by exclusion of flowing material during the molding of the cutting board. The step of molding the retainer onto the cutting board optionally includes forming the third tool 78 as an integral part of the retainer.

As previously stated, the cutting board and tools of the first invention are integrally formed of a single material. Nonetheless, in one or more other embodiments of the invention, tools associated with boards are formed of materials that are different from the materials of which the boards are formed. Further exemplary materials for boards and tools include, but are not limited to: metals such as steel for defining the blades of peelers, zesters, slicers, graters, scrapers, letter openers, pencil sharpeners, files, and rasps; glass and polymethylmethacrylate (PMMA) for defining thermometers, optical devices such as magnifiers, light focusing elements, and timepiece lenses; synthetic and natural fibers for defining brushes and strainers; rubber and soft polymers for defining erasers, ink and pigment stamps, and wipers and squeegees; natural stone, natural coarse materials such as coral, and processed hard mineral compositions for defining sharpeners, match-strike tools, emery boards, and callous files; and natural and man-made porous and absorbent materials for defining sponges and blotters.

Furthermore, in one or more embodiments of the invention other than the first embodiment, boards are associated with tools that comprise manufactured implements. Exemplary manufactured implements include, but are not limited to: batteries; light emitting diodes; flashlight assemblies; compass assemblies; adjustable wrenches, pliers, clamps, presses, tweezers, scissors, staplers, and hole punches; pens, pencils, and other markers; dispensers for tape, postal stamps, cords, and other rolled, spooled, and stacked materials and items; and dispensers and reservoirs for fluid adhesives, fluid lubricants, correction fluids, inks, paints, pigments, and powders; and dispensers and shakers for condiments, spices, and the like.

Additional embodiments of the invention, some of which are illustrated in the accompanying drawings, are described hereinafter. It should be understood, however, that the present invention has many more embodiments and applications than those particularly detailed and numbered in these descriptions. Thus, these descriptions are not intended, nor are to be construed, to limit the scope of patent protection afforded the present invention, which scope is to be defined by the claims and the equivalents thereof.

Figure 12:
FIG. 12 is an environmental plan view of a second embodiment of the invention.

A second embodiment of the invention, which embodiment relates to a teaspoon, as shown in FIG. 12, comprises a cutting board, a zester, a grater, and a measuring spoon (indentation 1201) having the volume of a teaspoon.

Figure 13:
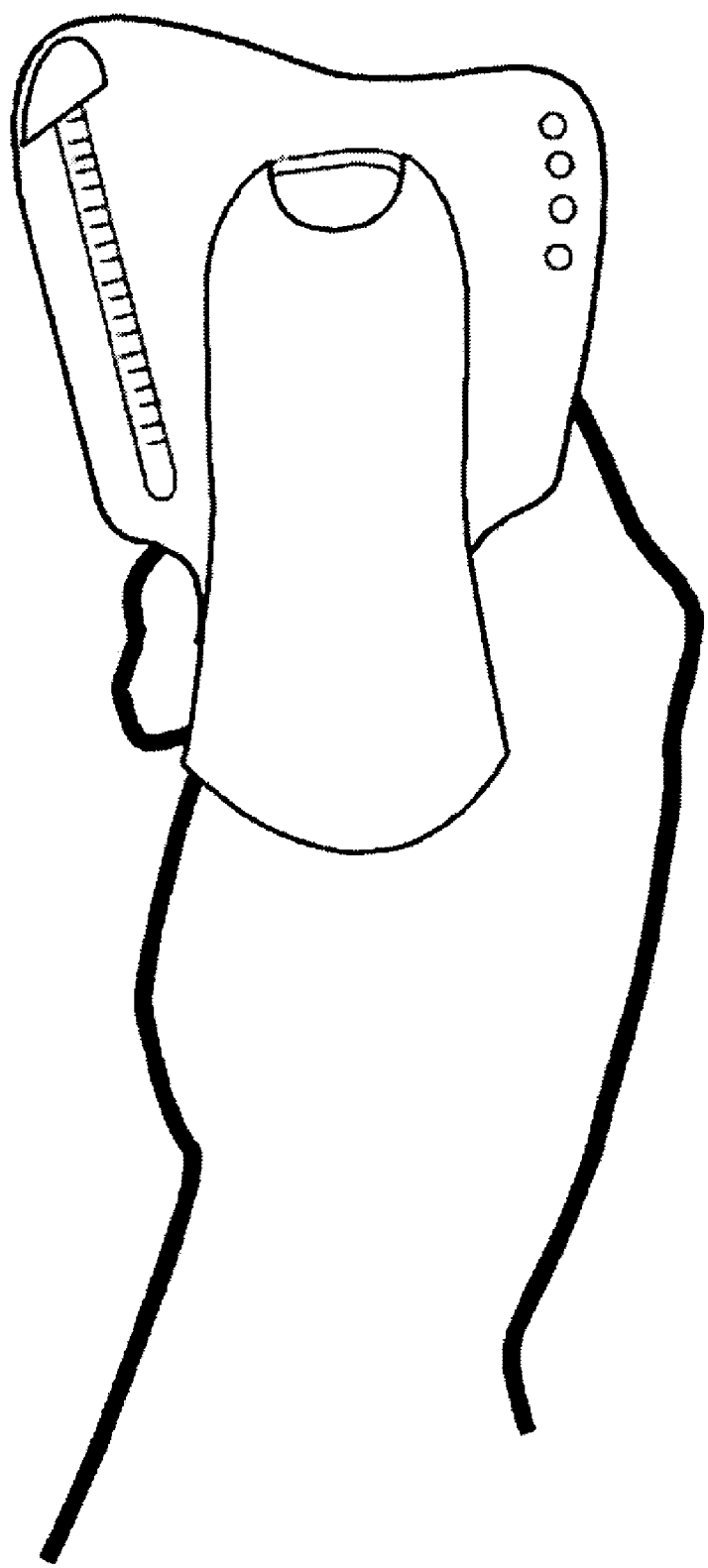
FIG. 13 is an environmental plan view of a third embodiment of the invention.

A third embodiment of the invention, which embodiment relates to a multi-tool for a barista, as shown in FIG. 13, comprises a spadle, a zester, and a thermometer.

A fourth embodiment (not illustrated) of the invention, which embodiment relates to a multi-tool for a barista, comprises a spatula, a zester, a thermometer, and a measuring spoon having the volume of a tablespoon.

Figure 14:
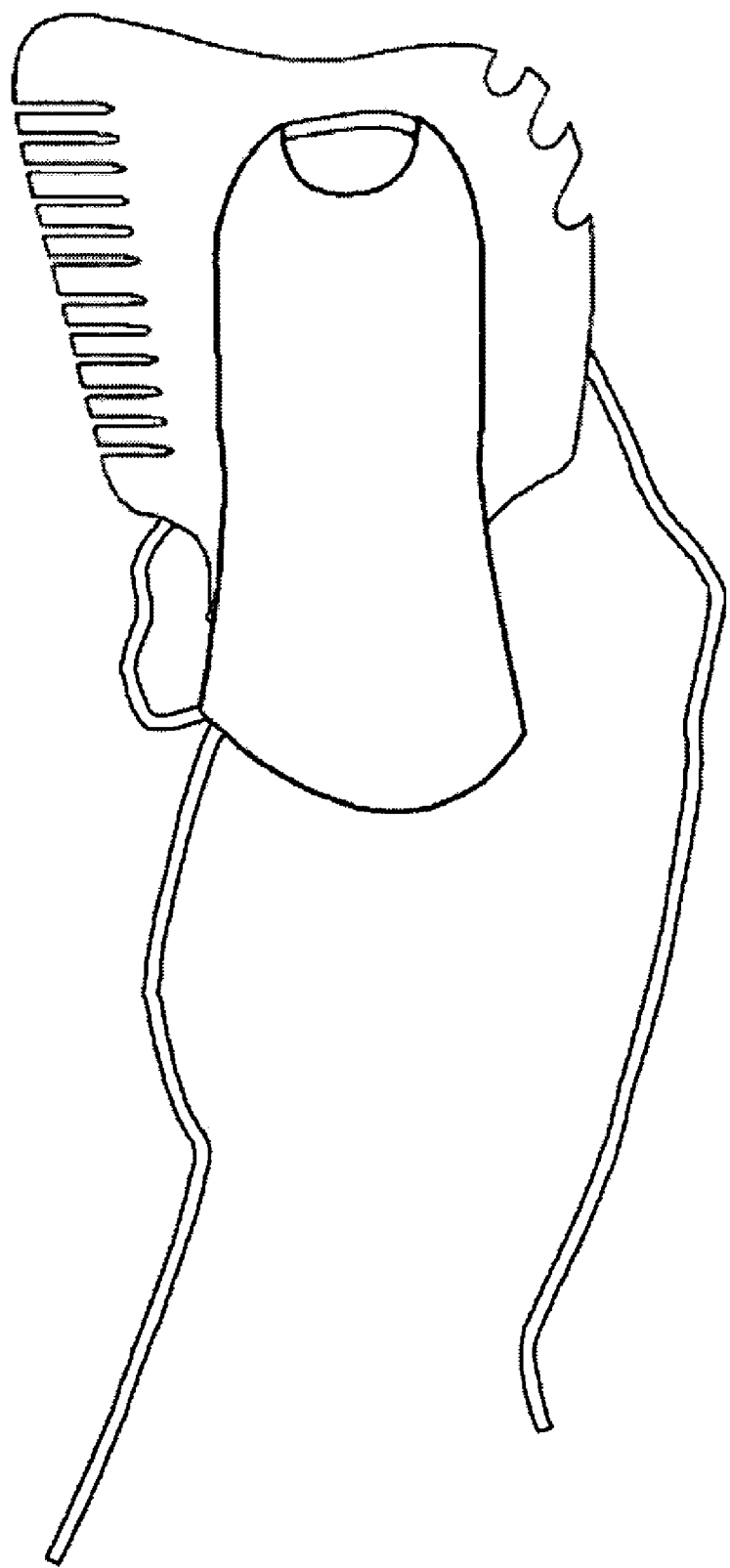
FIG. 14 is an environmental plan view of a fifth embodiment of the invention.

A fifth embodiment of the invention, which embodiment relates to pastry combs, as shown in FIG. 14, comprises a coarse pastry comb and a fine pastry comb.

A sixth embodiment (not illustrated) of the invention, which embodiment relates to pastry utensils, comprises detail combs, a spatula, and two graters, namely a coarse grater and a fine grater.

Figure 15:
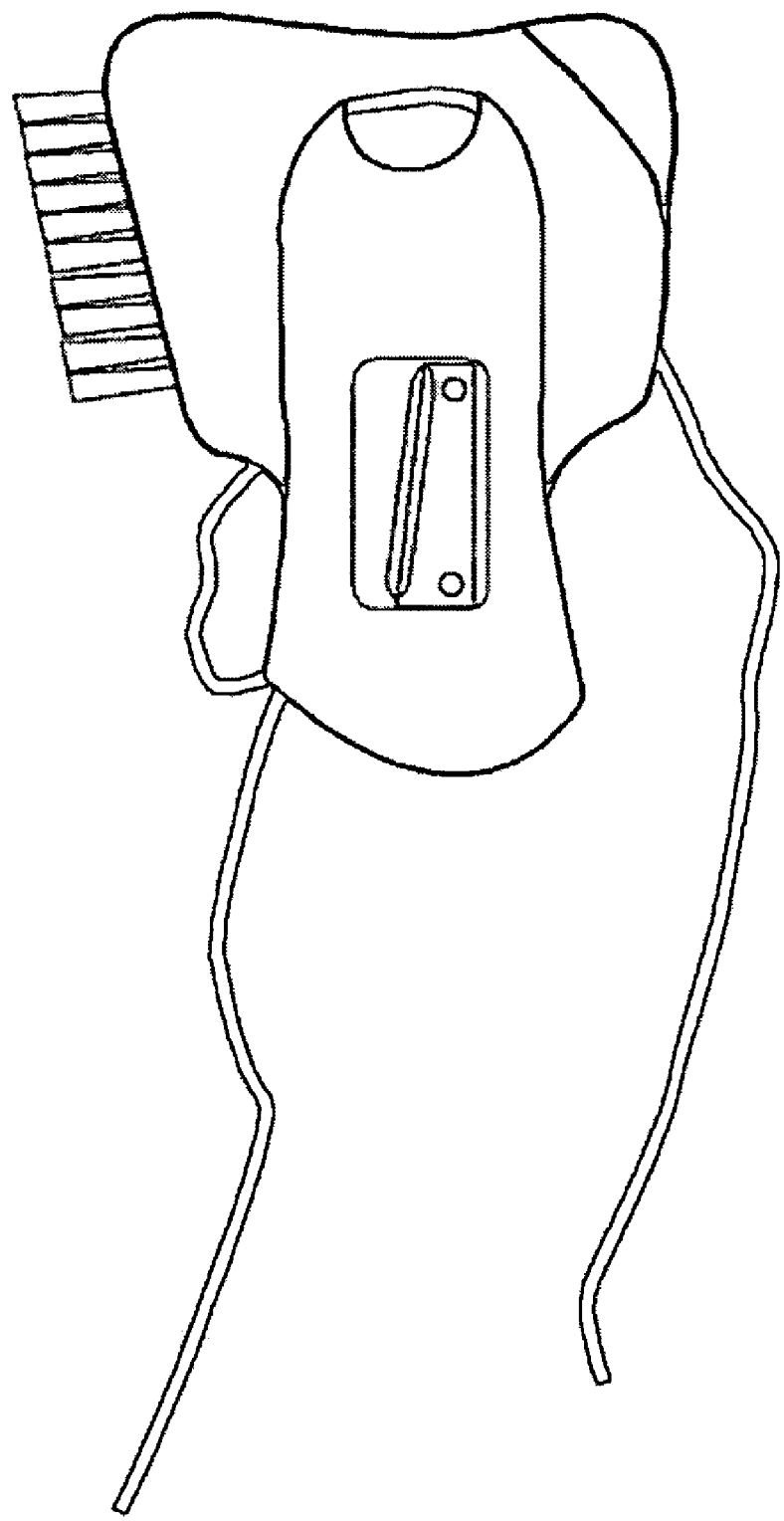
FIG. 15 is an environmental plan view of a seventh embodiment of the invention.

A seventh embodiment of the invention, which embodiment relates to a multi-tool for an artist or painter, as shown in FIG. 15, comprises a spatula or palette knife, a brush, an eraser, and a sharpener.

Figure 16:
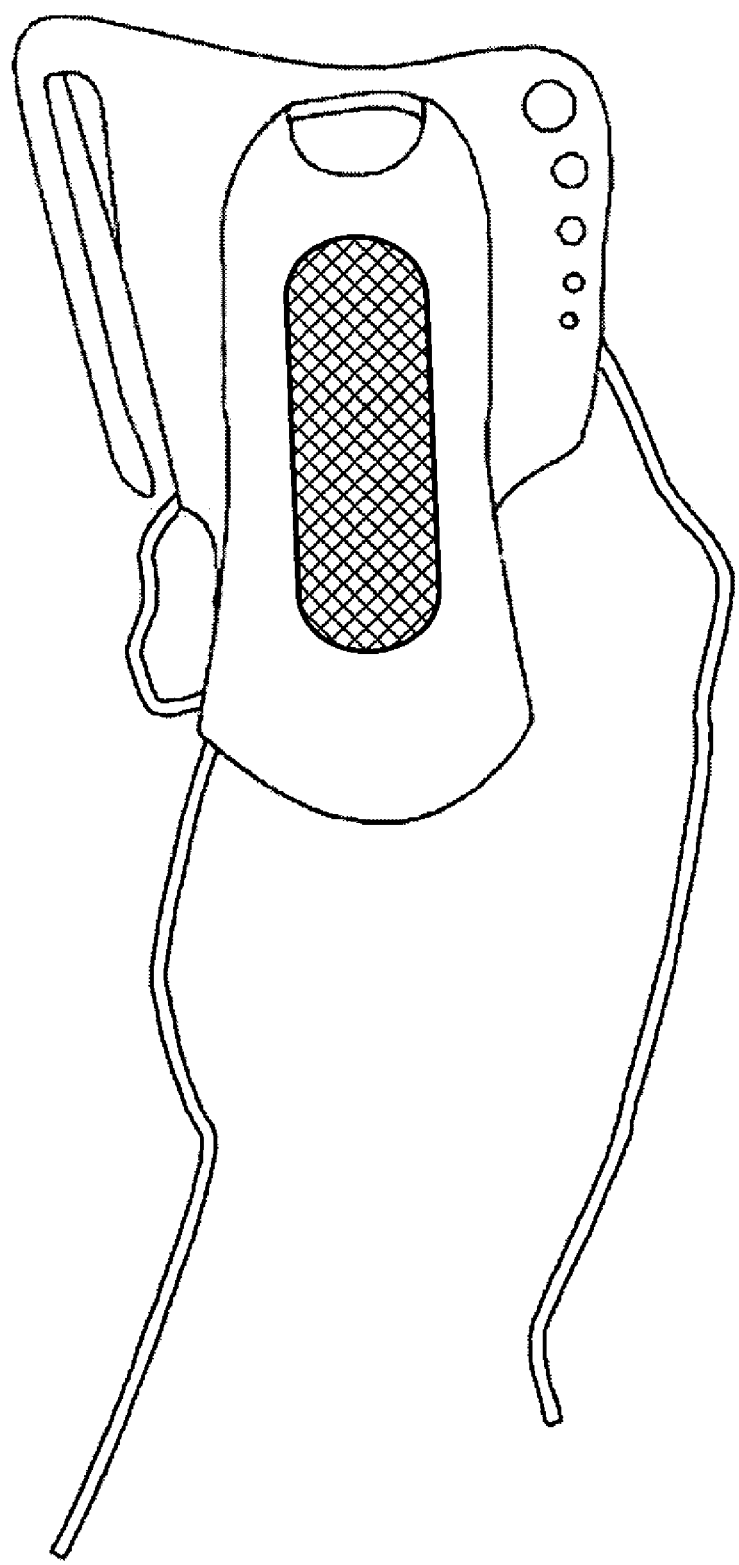
FIG. 16 is an environmental plan view of an eighth embodiment of the invention.

An eighth embodiment of the invention, which embodiment relates to a multi-tool for a craftsman such as an electrician, as shown in FIG. 16, comprises a gauge for measuring lines such as wires, a cutter for cutting lines such as wires, and a sharpener and match strike area.

A ninth embodiment (not illustrated) of the invention, which embodiment relates to a multi-tool for a craftsman such as an electrician, comprises an LED flashlight, a measuring guide, and wire gauge holes.

A tenth embodiment (not illustrated) of the invention, which embodiment relates to a multi-tool for a masonry craftsman, comprises a line cutter and a tool for spreading grout and mortar.

Figure 17:
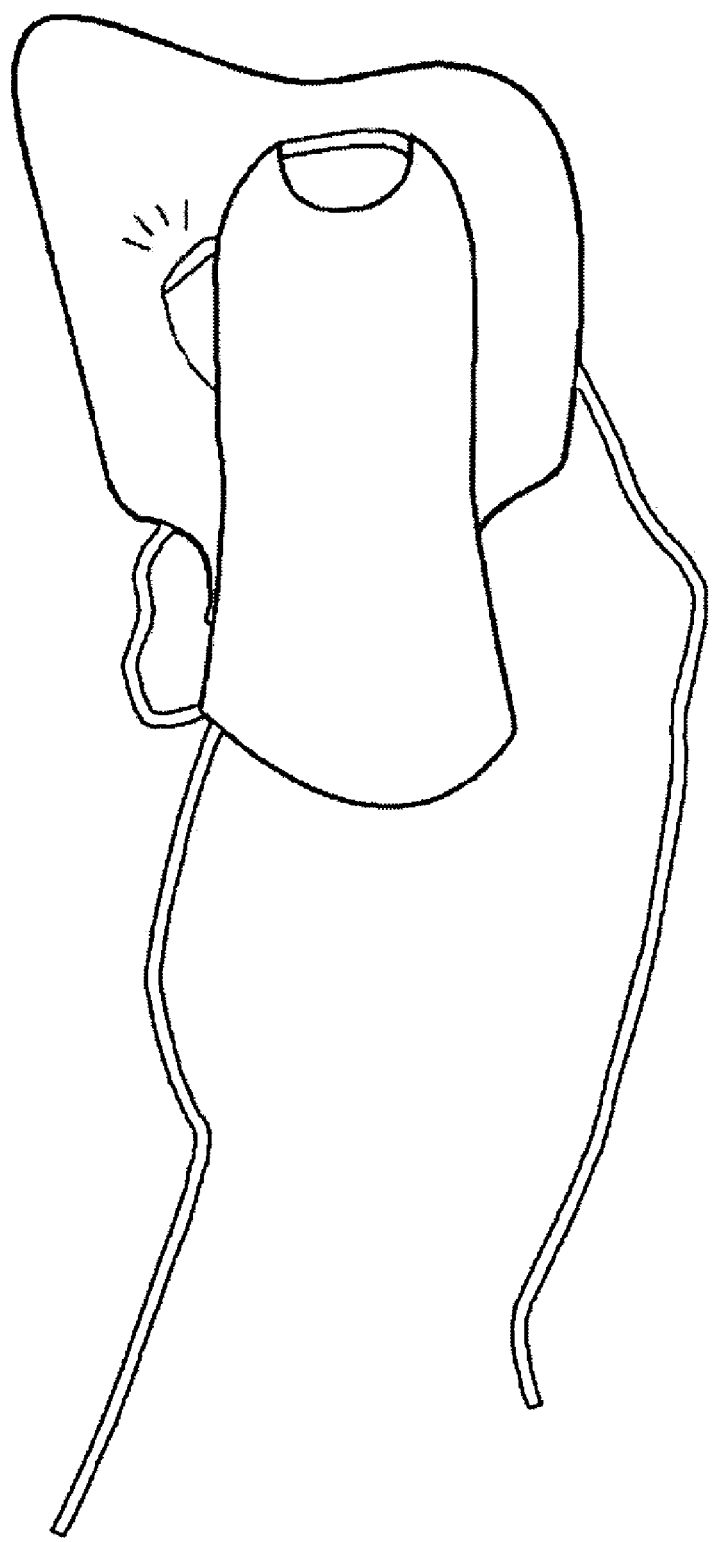
FIG. 17 is an environmental plan view of an eleventh embodiment of the invention.

An eleventh embodiment of the invention, which embodiment relates to a lighted multi-tool, as shown in FIG. 17, comprises a pressure-sensitive LED flashlight.

Figure 18A:
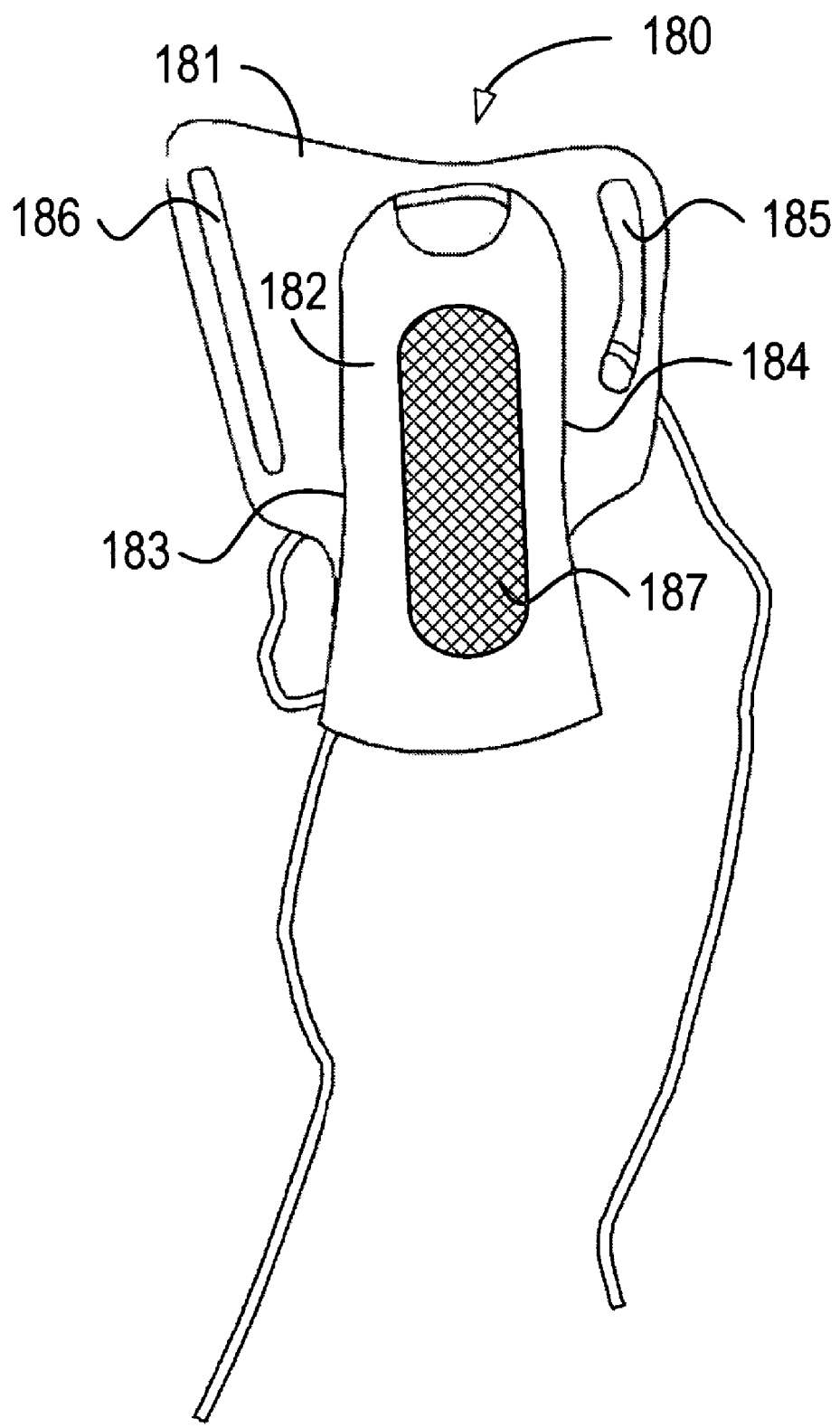
FIG. 18a is an environmental plan view of a twelfth embodiment of the invention.
Figure 18B:
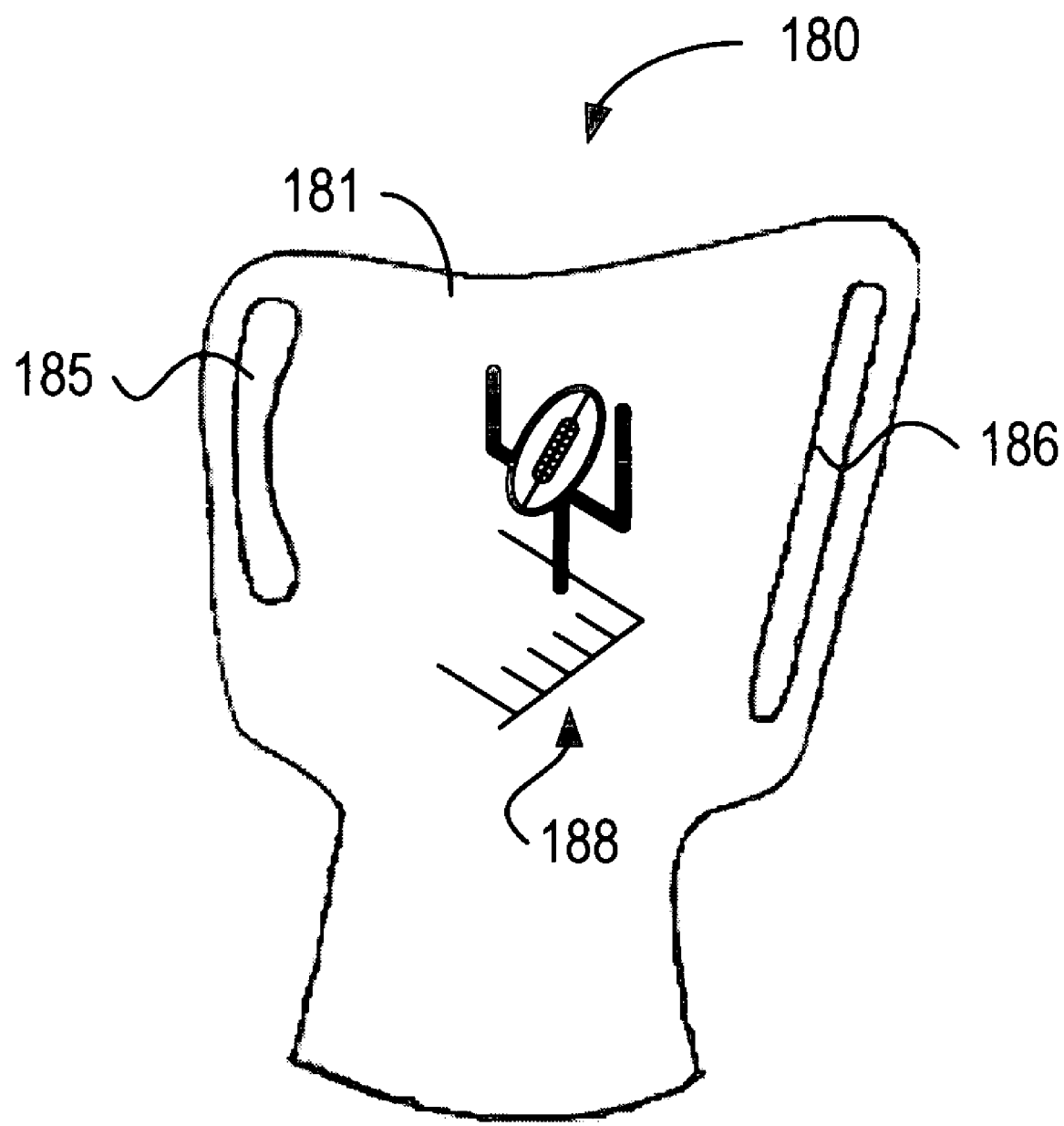
FIG. 18b is another plan view of a twelfth embodiment of the invention.

A twelfth embodiment of the invention, which embodiment relates to a utensil 180 for camping and for tailgate parties, as shown in FIG. 18A-18B, comprises a shield 181, and a sheath 182 attached to the shield for receiving the digit of a hand for mounting of the shield onto the hand. The shield extends transversely to the sheath beyond opposite sides 183, 184 of the sheath. The article 180 further comprises a bottle opener 185, a peeler 186, and a frictional element 187 that is useful as a sharpener and for striking matches.

As shown in FIG. 18B, the shield includes an uninterrupted cutting surface for protection of the digit during cutting of items against the shield when the utensil 180 (FIGS. 18A-18B) is used similarly as the utensil 5 is used in FIG. 10. The cutting surface of the shield (FIG. 18B) has thereon graphical indicia 188. The graphical indicia optionally relate to any topic, activity, or information of use or of interest to the manufacturer or recipient of the article. The graphical indicia may provide informational or amusing benefits to the article 180 and may provide an incentive to buy the article or promotionally distribute the article for advertising. In the example illustrated in FIG. 18B, the graphical indicia relate to a sport, namely football. In other examples, graphical indicia relate to: a particular sports teams; a particular school; recipes for food and beverages; and conversions relating thermometric and volumetric scales. It should be apparent that graphical indicia relating to any subject may appear on any surface of any embodiment of the present invention. In particular, though not illustrated as such, the cutting surface 12 (FIG. 4) and second surface 14 (FIG. 3) of the cutting board 10 of the utensil 5 each optionally comprise respective graphical indicia.

A thirteenth embodiment (not illustrated) of the invention, which embodiment relates to a camping multi-tool, comprises an LED flashlight, a match strike area, a lighter molded into the multi-tool, a whistle, and a spoke wrench such as that for a mountain bike.

A fourteenth embodiment (not illustrated) of the invention, which embodiment relates to a multi-tool for camping and orienteering, comprises a compass, a magnifying glass, a knife sharpener, a match strike area, and an LED flashlight.

A fifteenth embodiment (not illustrated) of the invention, which embodiment relates to a multi-tool for fishing, comprises: a hook sharpener; a measuring guide; storage for hooks, lures, slugs, and the like; and a line cutter.

A sixteenth embodiment (not illustrated) of the invention, which embodiment relates to a multi-tool for use at a tailgate party or cookout, comprises a bottle opener, decals relating to teams and sports, a match strike area, a lighter molded into the multi-tool, and an LED flashlight.

A seventeenth embodiment (not illustrated) of the invention, which embodiment relates to veterinary and medical uses, comprises a tongue depressor, an LED flashlight, and a thread cutter.

Figure 19:
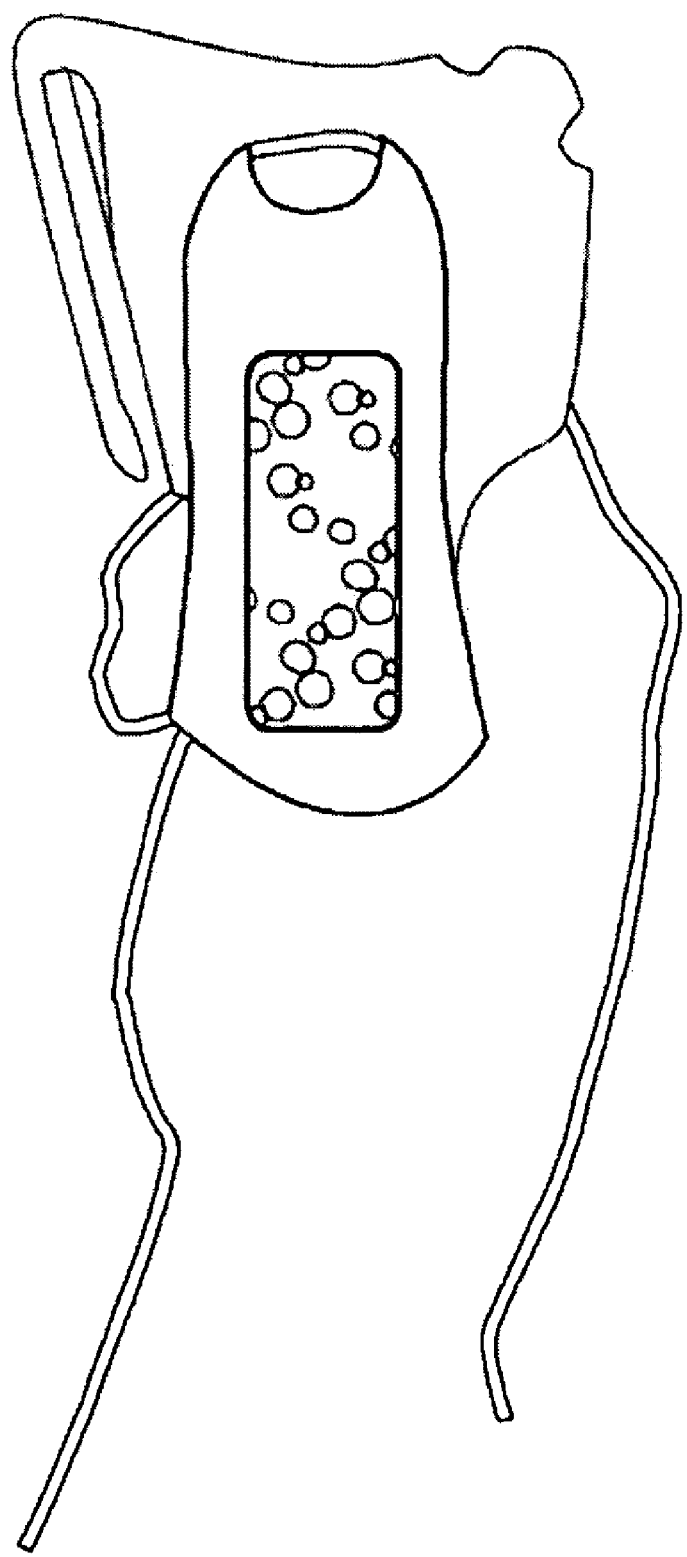
FIG. 19 is an environmental plan view of an eighteenth embodiment of the invention.

An eighteenth embodiment of the invention, which embodiment relates to an office multi-tool, as shown in FIG. 19, comprises a sponge, a letter opener, and a staple remover.

A nineteenth embodiment (not illustrated) of the invention, which embodiment relates to gardening and floral arrangements, comprises a line cutter, a stalk cutter, a brush, and a small trowel.

A twentieth embodiment (not illustrated) of the invention, which embodiment relates to a multi-tool for hobbies such as whittling, comprises a magnifying glass, a measuring guide, and a sharpening stone.

Figure 20:
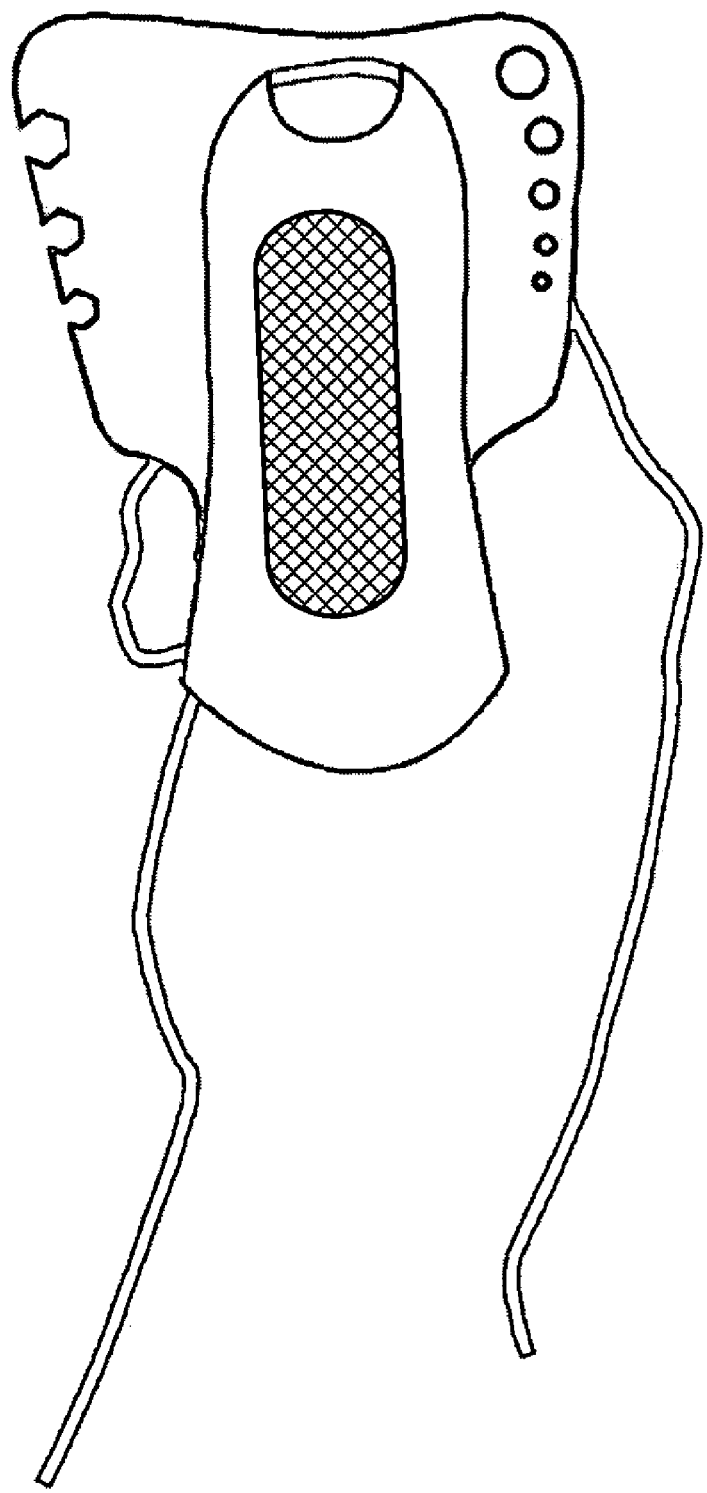
FIG. 20 is an environmental plan view of a twenty-first embodiment of the invention.

A twenty-first embodiment of the invention, which embodiment relates to a spoke wrench, as shown in FIG. 20, comprises a plurality of spoke wrenches, a plurality of spoke gauges, and a file.

As will be appreciated by the ordinary artisan, the present invention includes any embodiment of a utensil having two or more tools. Exemplary tools and combinations thereof are identified for illustrative purposes in understanding the present invention and are not intended to be limitations of the present invention, the present invention being limited only by the claims of any patent or patents issuing here from.

What is claimed is:

1. A utensil for protecting a thumb of a hand holding a knife during a cutting operation, comprising:
   (a) a cutting board for disposition between the thumb and an index finger of the hand, said cutting board having a cutting surface for orienting toward the index finger and a second surface for orienting toward the thumb; and
   (b) a retainer having two lateral sides and being configured to receive and releasably retain the thumb along a longitudinal length of said retainer, said retainer being attached to said cutting board along a portion of said longitudinal length of said retainer, said longitudinal length of said retainer being greater than a majority of a longitudinal length of said cutting board;
   (c) wherein said cutting surface is uninterrupted for protection of the thumb during cutting against said cutting surface;
   (d) wherein said cutting board extends transversely to a direction defined by said longitudinal length and extends beyond said two lateral sides of said retainer; and
   (e) wherein the utensil further comprises a tool defined by said cutting board.

2. The utensil of claim 1, wherein said cutting board comprises a first material, and said retainer comprises a second material that is different from said first material.

3. The utensil of claim 2, wherein said retainer is molded on said cutting board.

4. The utensil of claim 2, wherein said first material is harder than said second material.

5. The utensil of claim 4, wherein said first material comprises Nylon 66.

6. The utensil of claim 4, wherein said second material comprises a thermoplastic elastomer.

7. The utensil of claim 4, wherein said second material comprises silicon.

8. The utensil of claim 1, wherein said cutting surface of said cutting board comprises graphical indicia.

9. The utensil of claim 8, wherein said graphical indicia relate to a sports team.

10. The utensil of claim 8, wherein said graphical indicia relate to a school.

11. The utensil of claim 1, wherein said cutting surface of said cutting board is a convex surface.

12. The utensil of claim 11, wherein said second surface of said cutting board is a convex surface.

13. The utensil of claim 1, wherein said tool is a zester, a peeler, a slicer, a grater, a pastry comb, a measuring spoon, or a bottle opener.

14. The utensil of claim 1, wherein said tool is defined by an aperture or recess defined in said cutting board, said aperture or recess formed by exclusion of flowing material at the time of formation of said cutting board in an injection molding process.

15. The utensil of claim 1, wherein the tool defined by said cutting board is located proximate one of the lateral sides of said retainer; and wherein the utensil further comprises a second tool defined by said cutting board, said second tool being located proximate the other one of the lateral sides of said retainer.

16. The utensil of claim 15, wherein one of said tools is a zester and the other of said tools is a peeler.

17. A utensil for protecting a thumb of a hand holding a knife during a cutting operation, comprising:
   (a) a cutting board for disposition between the thumb and an index finger of the hand, said cutting board having a cutting surface for orienting toward the index finger and a second surface for orienting toward the thumb; and
   (b) a retainer having two lateral sides and being configured to receive and releasably retain the thumb along a longitudinal length of said retainer, said retainer being attached to said cutting board along a portion of said longitudinal length of said retainer, said longitudinal length of said retainer being greater than a majority of a longitudinal length of said cutting board;
   (c) wherein said cutting surface is uninterrupted for protection of the thumb during cutting against said cutting surface;
   (d) wherein said cutting board extends transversely to a direction defined by said longitudinal length and extends beyond said two lateral sides of said retainer; and
   (e) wherein the utensil further comprises a brush extending from said retainer.

18. A utensil for a digit of a hand for protecting the digit during a cutting operation, comprising:
   (a) a shield; and
   (b) a sheath having two lateral sides and being configured to receive and releasably retain the digit along a longitudinal length of said sheath, said sheath being configured to receive therein and surround a majority of the digit of the hand, said sheath further being attached to said shield along a portion of said longitudinal length of said sheath, said longitudinal length of said sheath being greater than a majority of a longitudinal length of said shield;
   (c) wherein said shield extends transversely to a direction defined by said longitudinal length of said sheath and extends beyond the two lateral sides of said sheath;
   (d) wherein said shield includes an uninterrupted surface for protection of the digit during cutting against said surface; and
   (e) wherein the utensil further comprises a tool defined by said shield.

19. The utensil of claim 18, wherein the utensil further comprises a brush extending from said sheath.

20. A utensil for protecting a digit of a hand holding a knife during a cutting operation, comprising:
   (a) a lumen that is configured to receive and releasably retain the digit of the hand along a longitudinal length of the lumen for mounting of the utensil to the hand;
   (b) a cutting board having a cutting surface, said cutting board defining a first portion of said lumen; and
   (c) a retainer attached to said cutting board, said retainer defining a second portion of said lumen such that said first portion and said second portion collectively define said lumen;
   (d) wherein said cutting board comprises a first material and said retainer comprises a second material that is different from said first material;
   (e) wherein the longitudinal length of the lumen is longer than a longitudinal length of the cutting board; and
   (f) wherein said cutting board extends past opposite lateral sides of said lumen.

21. The utensil of claim 20, wherein a second surface of said cutting board located on an opposite side of said cutting surface defines said first portion of said lumen.

22. The utensil of claim 20, wherein said second portion defines, at a first end of said lumen, a first opening configured to receive therethrough the digit of the hand for receipt and retention of the digit within the lumen.

23. The utensil of claim 22, wherein said first portion and second portion collectively define, at a second end of said lumen opposite said first end, a second opening of said lumen.

24. The utensil of claim 20, wherein wherein said cutting surface of said cutting board is uninterrupted in extent between opposite longitudinal sides of said lumen for protection of the digit during cutting against said cutting board.

25. The utensil of claim 20, wherein said cutting surface comprises a surface that is curved in extent between opposite longitudinal sides of said lumen.

26. The utensil of claim 20, wherein the utensil further comprises a tool defined by said cutting board.

27. The utensil of claim 20, wherein the utensil further comprises a brush extending from said retainer.

28. The utensil of claim 27, wherein the utensil further comprises a tool defined by said cutting board.

29. A utensil for protecting a thumb of a hand holding a knife during a cutting operation, comprising:

(a) a cutting board having a cutting surface; and (b) a retainer configured to receive and releasably retain the thumb along a longitudinal length of said retainer, said retainer being attached to said cutting board along a portion of said longitudinal length of said retainer, said longitudinal length of said retainer being greater than a majority of a longitudinal length of said cutting board;

(c) wherein said cutting surface is uninterrupted for protection of the thumb during cutting against said cutting surface;

(d) wherein said cutting board extends past opposite lateral sides of said retainer;

(e) wherein the utensil further comprises a tool defined by said cutting board; and (f) wherein the utensil further comprises a brush extending from said retainer.

\* \* \* \* \*